United States Patent [19]
Itoh et al.

[11] Patent Number: 4,870,333
[45] Date of Patent: Sep. 26, 1989

[54] AUTOMATIC OPENING AND CLOSING DEVICE FOR A WINDOW

[75] Inventors: Takeshi Itoh, Katsuta; Akihiko Tsukahara, Fujisawa, both of Japan

[73] Assignee: Jidosha Denki Kogyo Kabushiki Kaisha, Kanagawa, Japan

[21] Appl. No.: 103,767

[22] Filed: Oct. 2, 1987

[30] Foreign Application Priority Data

Oct. 3, 1986 [JP] Japan ................. 61-234658
Oct. 9, 1986 [JP] Japan ................. 61-240378

[51] Int. Cl.$^4$ ............................................. H02P 1/22
[52] U.S. Cl. ................................... 318/286; 318/266; 318/466
[58] Field of Search ............... 318/256, 265, 266, 466, 318/467, 468, 469, 470, 603, 280, 286; 29/26, 28, 199

[56] References Cited

U.S. PATENT DOCUMENTS

| | | | |
|---|---|---|---|
| 4,035,702 | 7/1977 | Pettersen et al. | 318/467 X |
| 4,234,833 | 11/1980 | Barrett | 318/468 X |
| 4,514,670 | 4/1985 | Fassel et al. | 318/266 X |
| 4,529,920 | 7/1985 | Yoshida et al. | 318/466 |
| 4,563,625 | 1/1986 | Kornbrekke et al. | 318/603 |
| 4,608,637 | 8/1986 | Okuyama et al. | 318/466 |

FOREIGN PATENT DOCUMENTS 2580717 10/1986 France ..................... 49/199

Primary Examiner—Bentsu Ro
Attorney, Agent, or Firm—Sughrue, Mion, Zinn, Macpeak & Seas

[57] ABSTRACT

An automatic opening and closing device for a window which has a forwardly and reversely rotatable motor for opening and closing the widow, switching means which instructs said motor to rotate, pulse-detecting means which detects a pulse generated along with a rotation of said motor, counting means which counts a pulse number detected by said pulse-detecting means and rotation-controlling means which performs rotation-control to said motor on basis of a count number counted by said counting means and a predetermined count number is disclosed, by which it is possible to stop the opening or closing action of the window at a halfway, or possible to convert the action of the window in the reverse direction.

5 Claims, 12 Drawing Sheets

AUTOMATIC OPENING AND CLOSING DEVICE FOR A WINDOW

BACKGROUND OF THE INVENTION

1. Field Of The Invention

This invention relates to an automatic opening and closing device for a window, and in particular to motor driven automatic opening and closing device for a window which is suitable for opening and closing a window and which is also called a power window in the case of use for an automobile.

2. Description of the Prior Art

Two types of opening and closing devices for a window of an automobile are known. One of them is a type which is wound-up and wound-down by manual operation, and another type is a power window herein the window is activated up and down automatically by a drive motor with a switching operation. Among them, the latter has been popularized recently, because it is possible that the window can be opened or closed only by a switching operation while driving the automobile. The automatic opening and closing device for the window is, generally, a device wherein the window is moved to be opened or closed by activating the forwardly and reversely rotatable motor with a manual operation switch. The window continues to ascend or descend while the manual operation switch is switched on.

Meanwhile, in the case of smoking in a car compartment, air in the car compartment is tainted, so that the window is sometimes opened sufficiently to accelerate ventilation of air. In this case, it is necessary to operate an up-down-switch delicately. Therefore, if the driver performs such a switching operation while driving the car, the driving operation is disturbed, so that there is the possibility of causing an accident.

To prevent the above mentioned problem accompanied by the operation for opening and closing the window, for example, there is a device disclosed in Japanese Utility Model Publication No. 60-169015. Considering the fact that a smoker uses an ashtray during smoking, the device is designed such that drawing the ashtray from a retainer of a smoking fixture provided in the car compartment, the window begins to open in linkage with it, and stops automatically when the window is opened a predetermined amount so desirable ventilation is obtained.

However, in the device described in said Publication, the cost of the parts and assembling increases because it is necessary to additionally provide a switching means for the machinery for ascent and descent related to the smoking fixture in order to open and close the window. Furthermore, it is necessary to draw the ashtray for the ventilation even if tobacco is not smoked.

On the other hand, in the automatic opening and closing device for the window, there is a problem that if an obstacle such as a hand or a head of an occupant is inserted between the window and a window frame in the ascending process of the window, the obstacle is caught between them. Therefore, various methods have been examined to resolve the problem.

For example, Japanese Patent Publication No. 60-185626 discloses a method wherein an abnormality such as squeezing of the obstacle is detected by means of detecting the bending of an optical fiber assembled into the window frame. Further, Japanese Patent Publication No. 60-185625 discloses a method wherein a pattern of electric charging data of a motor for ascending and descending the window under the normal state is memorized previously and an abnormality such as squeezing of the obstacle is detected by comparing said data as a reference pattern with data at actual operation.

However, concerning the method described in said Patent Publication No. 60-185626 it is necessary to assemble an expensive optical fiber into the window frame, working steps increase and a special detecting device must be provided In general, on the occasion of mounting a sensor for squeezing detection it is the present situation that a practical application is difficult for the problem in mounting due to limitations in manufacturing of the door part including the window frame and the window and a substantial increase in cost following this and a problem in reliability.

With respect to the method described in Patent Publication No. 60-185625, although the influence of fluctuations of motor load including a slide resistance between the window and the wind frame mounted on the car can be solved, it is necessary to operate the manual memory-switch for memorizing the reference data when the window is ascended or descended. Further, it is necessary to provide a limit switch for detecting whether the window gets to the full-opened position or full-closed position. Furthermore, there is no consideration concerning the fact that the reference data is the data under normal operation.

SUMMARY OF THE INVENTION

This invention is made in view of the above mentioned problems of the prior art, its object is to provide an automatic opening and closing device for a window which is easy to operate, fast in its response, furthermore unnecessary to provide a special switching device and a kind of sensor, possible to exhibit a desirable ventilative ability, and can prevent the accident of squeezing an obstacle.

In order to accomplish said object, an automatic opening and closing device for a window according to one aspect of the invention is characterized in that it has a forwardly and reversely rotatable motor to open and close a window, a switching means to instruct said motor to rotate, a pulse-detecting means to detect a pulse generated along with a rotation of said motor, a counting means to count a pulse-number detected by said pulse-detecting means and to reset a count number into a predetermined count number according to a prescribed signal, a holding means to hold the rotation of said motor according to a signal issued from said switching means, and a holding-cancel signal generating means to detect a count number counted by said counting means and to cancel a holding state of said holding means by generating a holding-cancel signal when the count number amounts to a predetermined reference value in an opening operation of the window.

According to the automatic opening and closing device for the window having a structure as described above, at the time when the window is descending and opening if the count number detected by the counting means reaches a predetermined reference value, a holding state of the holding means which holds the rotating action of the motor is cancelled and the motor stops rotating whereby the descent of the window stops at the position settled previously and the window is opened as much as necessary to ventilate.

Namely, in the structure as described above, the window descends and closes by operating the switching means and driving the motor, when said window reaches the fully closed state, the rotation of the motor is restricted, the pulse frequency of said pulse detecting means goes below the reference frequency and the count number of the counting means is reset to value predetermined such as initial value zero and the motor stops by discontinuing the switching operation.

Next, as said switching means is operated to descend, a descending signal issues and the window descends by motor driving. At this time the rotation of the motor is held by said holding means even if a descending signal by a subsequent switching operation does not issue, and the window continues to descend.

When the window descends a predetermined distance the count number of said counting means reaches to the value set previously, and said holding-cancel signal generating means detects it and issues a holding-cancel signal. The holding means cancels the rotation-holding state of the motor according to said signal, and the motor stops at the position where the window descends a prescribed distance.

In accordance with such action, the opening distance of a window sufficient to accelerate ventilation is obtained by a simple operation of a switching means.

An automatic opening and closing device for a window according to another aspect of the invention comprises a forwardly and reversely rotatable motor to open and close a window, a switching means to instruct said motor to rotate a pulse-detecting means to detect a pulse generated along with the rotation of said motor, a counting means to count a pulse-number detected by said pulse-detecting means, a window position-detecting means to detect whether or not said window is near to a closed position on the basis of the count number of said counting means, a speed operation means to calculate a rotational speed of said motor on the basis of the pulse detected by said pulse-detecting means a speed change operation means to calculate a rate of rotational speed change against the previously measured value of said motor on the basis of an output signal of said speed operation means, a window action-detecting means to detect whether said window is in a closing action a reversing instructive signal generating means to reverse said motor for opening said window if an output from said speed change operation means exceeds a predetermined first set point when said window action-detecting means detects said window to be the closing action and said window position-detecting means detects said window to be not near to the closed position and a stop instructive signal-generating means to stop said motor if the output from said speed change operation means exceeds a predetermined second set point when said window action-detecting means detects said window to be in the closing action and said window position-detecting means detects said window to be near to the closed position.

In the automatic opening and closing device for the window as described above when an obstacle is caught between a window frame and the window, damage or injury to a squeezed obstacle can be prevented without mounting of a special sensor, because the squeezing of the obstacle is detected before the stop of rotation of the motor and the window is made to descend by rotation of the motor in the reverse direction.

DETAILED DESCRIPTION OF THE INVENTION

Embodiment 1

Figure 1:
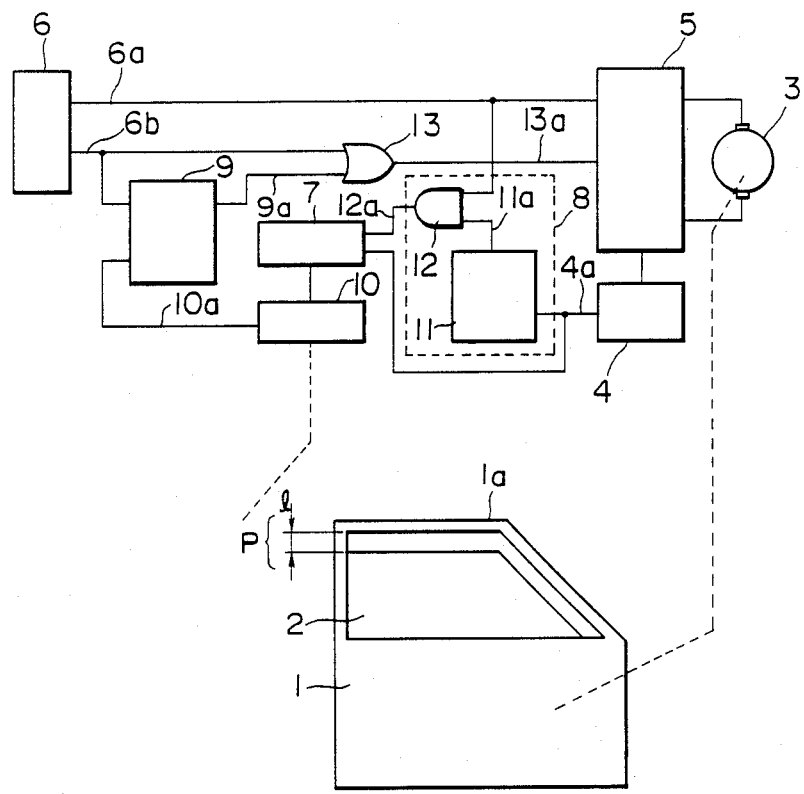
FIG. 1 is a block diagram of a first embodiment of the automatic opening and closing device for a window according to this invention.
Figure 2:
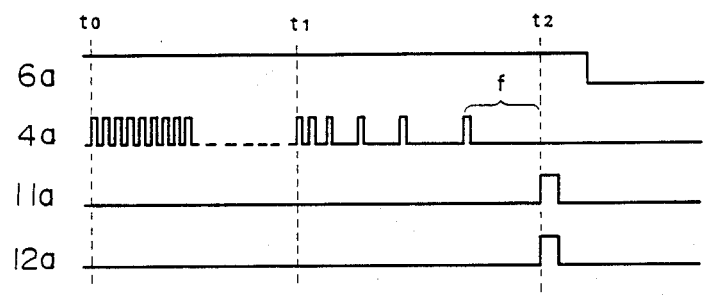
FIGS. 2(a), FIG. 2(b) and FIG. 2(c) are time charts showing action of the block diagram in FIG. 1. respectively.
Figure 2:
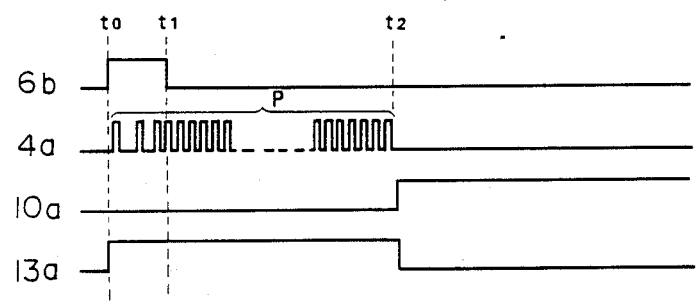
Figure 2:
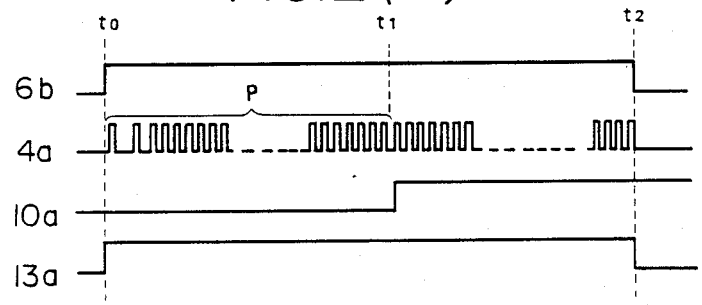

FIG. 1 and FIG. 2 are drawings to explain the first embodiment of this invention. In FIG. 1, an automatic opening and closing device for a window comprises mainly a forwardly and reversely rotatable motor 3 which causes a window 2 of a door 1 to ascend and descend, to thereby open and close, a pulse-detecting circuit 4 as a pulse-detecting means for detecting a pulse generated along with rotation of the motor 3, a motor-driving circuit 5 for driving the motor 3, a switch 6 as a switching means which gives instructions for rotation of the motor 3 to said driving circuit 5, a counter 7 as a counting means which counts a pulse detected by said pulse detecting circuit 4, an initial value-setting circuit 8 as a counting means similarly which resets said counter 7 to an initial value, a holding circuit 9 as a holding means which holds the rotation of the motor 3, and a holding-cancel signal generating circuit as a holding-cancel signal-generating means.

The motor 3 for ascending and descending said window 2 can rotate in the forward and reverse direction, the rotational direction being decided on the basis of an ascending demand signal 6a and a descending demand signal 6 generated by the operation of switch 6. Driving circuit 5 rotates motor 3 in the ascending direction (closing direction) under the ascending demand signal 6a from the switch 6, and rotates motor 3 in the descending direction (opening direction) under the descending signal 13a from OR gate 13 which selects either descending demand signal 6b or holding signal 9a described later.

The pulse-detecting circuit 4 connected with the driving circuit 5 amplifies a ripple of motor current generated along with the rotation of the motor 3, and outputs a pulse signal 4a into the counter 7 and the initial value-setting circuit 8.

The counter 7 counts the pulse number of the pulse signal 4a from the pulse-detecting circuit 4, and composes the counting means together with the initial value-setting circuit 8. The initial value-setting circuit 8 is composed of a rotation-detecting circuit 11 which issues a signal 11a when a frequency of the pulse signal 4a input from the pulse-detecting circuit 4 decreases below a reference frequency determined previously and an AND gate 12 which outputs a reset signal 12a resetting the counter 7 into zero corresponding to the initial value by the signal 11a and ascending demand signal 6a from the switch 6 as an input.

Further, the descending demand signal 6b of said switch 6 is input into the holding circuit 9, the holding circuit 9 outputs the holding signal 9a by the generating of said descending demand signal 6b as a trigger, the holding state is cancelled by a holding-cancel signal 10a input from a holding cancel signal generating circuit 10. Said holding-cancel signal generating circuit 10 has a function that a count number of the counter 7 is compared with the count number P (hereinafter, designated as a reference value) corresponding to an opening distance l of the window 2, and said holding-cancel signal 10a is outputted when the count number of the counter 7 amounts to the value not less than said reference value 7.

Secondly, an action of the automatic opening and closing device for the window composed as described above is explained in reference to the time charts shown in FIGS. 2(a), (b) and (c).

In FIG. 2(a), by operating the switch 6, the ascending demand signal 6a issues at the time $t_0$ the driving circuit 5 causes motor 3 to rotate in the ascending direction of the window 2. When the time $t_1$ comes soon after, the window 2 reaches the window frame 1a of the door 1, and becomes entirely closed. Thereupon, the rotation of the motor 3 is restrained, and the frequency of pulse signal 4a detected by the pulse-detecting circuit 4 decreases into the reference frequency F at the time $t_2$. When the frequency of pulse signal 4a becomes not more than the reference frequency f, the rotation-detecting circuit 11 issues a signal 11a . At this time, because the ascending demand signal 6a is output from the switch 6, said signal 11a and the ascending demand signal 6a are output into the AND gate 12, the resetting signal 12a is output to the counter 7 from the AND gate 12. The count number of the counter 7 is reset into zero. Thereafter, if the operation of the switch 6 ceases, the motor 3 stops.

After the window 2 is entirely closed by the above action, if the descending demand signal 6b issues by operating the switch 6 at the time $t_0$ as shown in FIG. 2(b), the OR gate 13 issues the descending signal 13a, according to the input of the descending signal 13a the driving circuit 5 causes motor 3 to rotate in the descending direction of the window 2. The holding circuit 9 issues the holding signal 9a on the basis of the input of the descending demand signal 6b. Then, breaking the operation of the switch 6 at the time $t_1$, the descending demand signal 6b halts, but the output of the holding circuit 9, i.e., the holding signal 9a continues to issue, so that the OR gate 13 outputs the descending signal 13a, the motor 3 still rotates in the descending direction of the window 2.

On the other hand, the pulse-detecting circuit 4 issues the pulse signal 4a accompanied by rotation of the motor 3 the counter 7 is counted up by input of the pulse signal 4a. When the time $t_2$ comes soon, the count number of counter 7 amounts to said reference value P corresponding to the opening distance of the window 2 settled previously. Then the holding-cancel signal generating circuit 10 issues the holding-cancel signal 10a , its output is input into holding circuit 9. The holding circuit 9 is cancelled from the holding state and the holding signal 9a halts. The descending signal 13a from the OR gate 13 halts by extinction of the holding signal 9a, so that the motor 3 stops.

According to the above mentioned action the window 2 descends down to the position where the distance between window 2 and window frame 1a is l, a predetermined distance from the entirely closed position, and stops automatically by one-touch-operation of the switch 6.

Above described action concerns the case of opening the window 2 a predetermined distance by the one-touch-operation of the switch 6, on the occasion of ordinary and continuous operation of the switch 6 without interruption, it acts in accordance with the time chart as shown in FIG. 2(c).

Namely, in FIG. 2(c) the descending demand signal 6b issues by operating the switch 6 at the time $t_0$ , the holding signal 9a and the descending signal 13a issue whereby the motor 3 rotates in the descending direction of the window 2. Next, when the count number of counter 7 amounts to said reference value P at the time $t_1$, the holding-cancel signal generating circuit 10 outputs the holding cancel signal 10a. Although the holding signal 9a halts by this output the OR gate 13 continues to issue the descending signal 13a and the motor 3 still rotates in the descending direction of the window 2 because the output of the descending demand signal 6b does not halt by switching on the switch 6. If the descending signal 6b is extinguished by turning off the switch 6 at the time $t_2$, the descending signal 13a of OR gate 13 also fades out, so that the motor 3 stops. Therefore, the action of the motor 3 stops corresponding to the operation of the switch 6 after the time $t_1$.

As described above, in the said first embodiment, the window 2 can be opened a predetermined distance from the closed state by a one-touch-operation of the switch 6 in the descending direction. Furthermore, in this embodiment it is not necessary to provide a switching means linked with the ashtray as in the prior art. The switch 6 makes the window 2 ascend and descend, so that the above mentioned action can be realized by the arrangement of an electric circuit so that the cost can be reduced.

Embodiment 2

In the above-described first embodiment, the opening distance l of window 2 is constant corresponding to the reference value P settled previously, however in many cases the car speed is not constant, and the common speed range varies according to respective roads such as a city street, a country road or an expressway. Therefore, the opening distance of the window corresponding to the car speed is sometimes required. Namely, it is necessary to open widely when running at a low speed, but it is possible to ventilate sufficiently through a smaller window opening at a high speed. From this viewpoint, it is found that it is very convenient to enable the opening distance of the window to be set corresponding to a running speed of the car.

Figure 3:
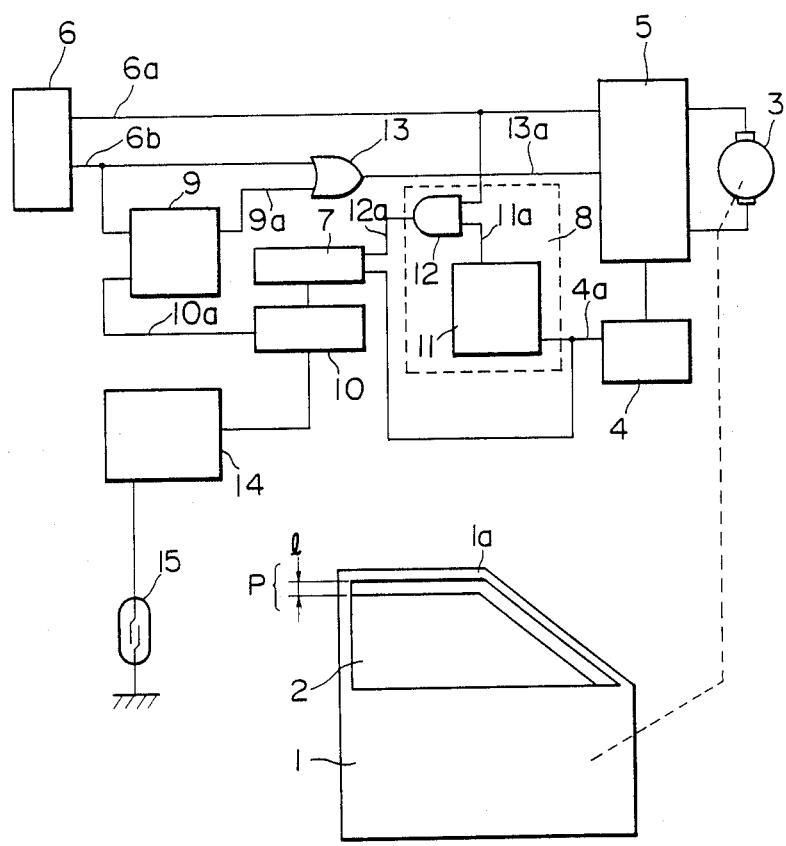
FIG. 3 is a block diagram of a second embodiment of the automatic opening and closing device for the window according to this invention.

The second embodiment shown in FIG. 3 is made in view of the above mentioned point. A reference value-setting circuit 14 which sets the reference value P for the count number of the counter 7 corresponding to the car speed is attached to the holding-cancel signal generating circuit 10 in the first embodiment, the holding-cancel signal generating means is composed of the holding-cancel signal generating circuit 10 and the reference value-setting circuit 14. Said reference value-setting circuit 14 determines the reference value P corresponding to the car speed by a car speed sensor 15 as shown in FIG. 3, and outputs the reference value P into the holding cancel signal-generating circuit 10. Therefore, the holding cancel signal generating circuit 10 compares the count number output from the counter 7 with said reference value P.

Figure 4:
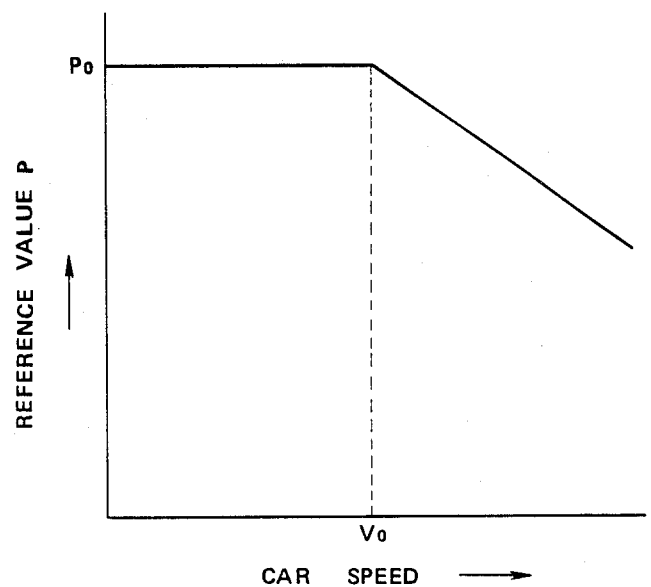
FIG. 4 is a diagram showing the relationship of car speed and reference value.

Said reference value P is fixed into value $P_0$ in a range from car speed 0 to a certain speed $V_0$, and the value P decreases inversely in the car speed range more than the threshold value V as seen from FIG. 4. The reference value P is correlated with the opening of the window 2, i.e., the opening distance l from the window frame 1a to the top of the window 2 as aforementioned, so that said opening distance l decreases according to the lowering of the reference value P, so that the opening distance sufficient to ventilate can be obtained only by a one-touch-operation of the switch 6. The other parts and actions which have not been explained are the same as that described for the first embodiment so that the explanation concerning this embodiment is limited accordingly.

As described above in the second embodiment, the cost is reduced and the desirable ventilation corresponding to the car speed can be performed in addition to the effects of the first embodiment because it is not necessary to provide a position detecting means such as a limit switch or the like which detects the opening distance l of the window 2.

Embodiment 3

FIGS. 5 to 11 show the third embodiment of this invention.

Figure 7:
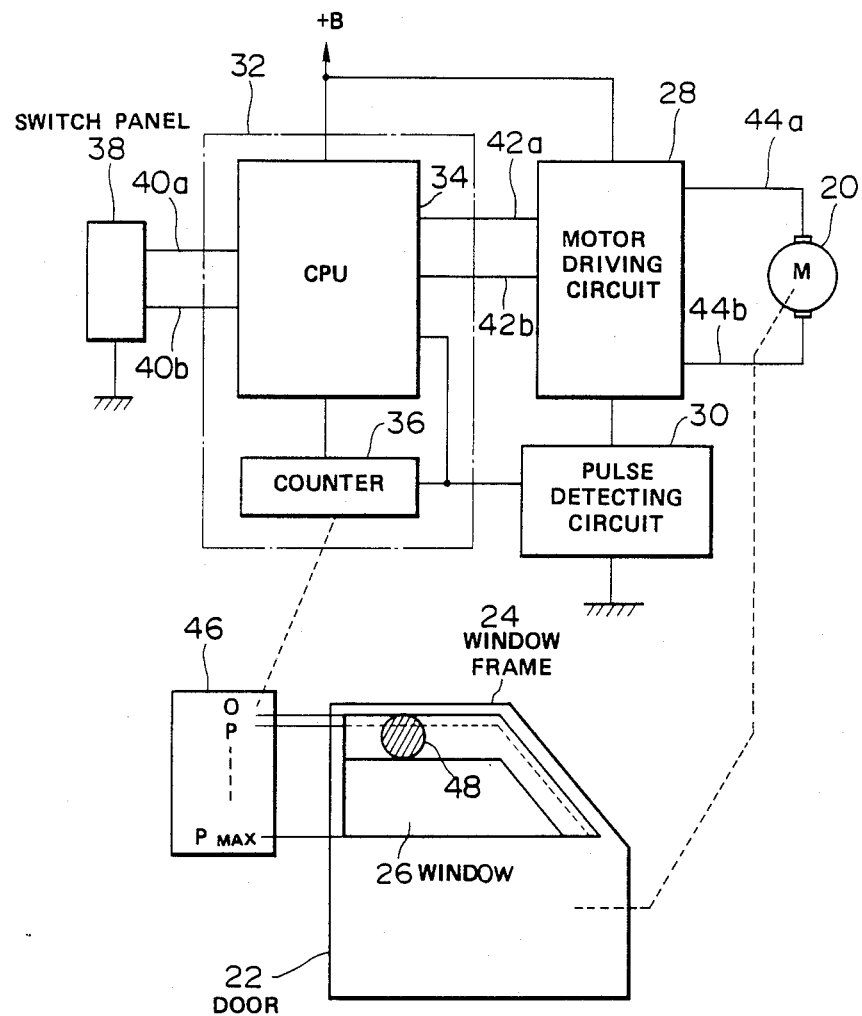
FIG. 7; is a block diagram of the third embodiment.

FIG. 7 is a block diagram showing the third embodiment of the automatic opening and closing device for the window according to the invention.

In FIG. 7, a motor 20 is a rotatable motor in the forward and reverse direction which is provided on a respective door 22 of the automobile. The motor 20 causes the window 26 fitted in a window frame 24 to ascend and descend, i.e, to open and close. The motor 20 is connected with a power source B through a motor-driving circuit 28.

The motor-driving circuit 28 is connected with a pulse-detecting circuit 30 which detects a pulse generated along with rotation of the motor 20 as a pulse-detecting means and a central processing unit (CPU) 34 of a controller 32. The controller 32 is connected with the power source B through a constant-voltage circuit (not shown) and provided inside with counter 36 as a counting means connected with the CPU 34. The CPU 34 receives an ascending demand signal 40a or a descending demand signal 40b for the window 26 from an operation switch panel 38 which the occupant operates and instructs the rotational action of the motor 20 as a switching means, and outputs an ascending signal 42a or a descending signal 42b into the motor-driving circuit 28. The driving circuit 28 issues forward driving signal making the window 26 ascend or a reverse driving signal making the window 2 descend to the motor 20 according to the output signal of the CPU 34.

Figure 5:
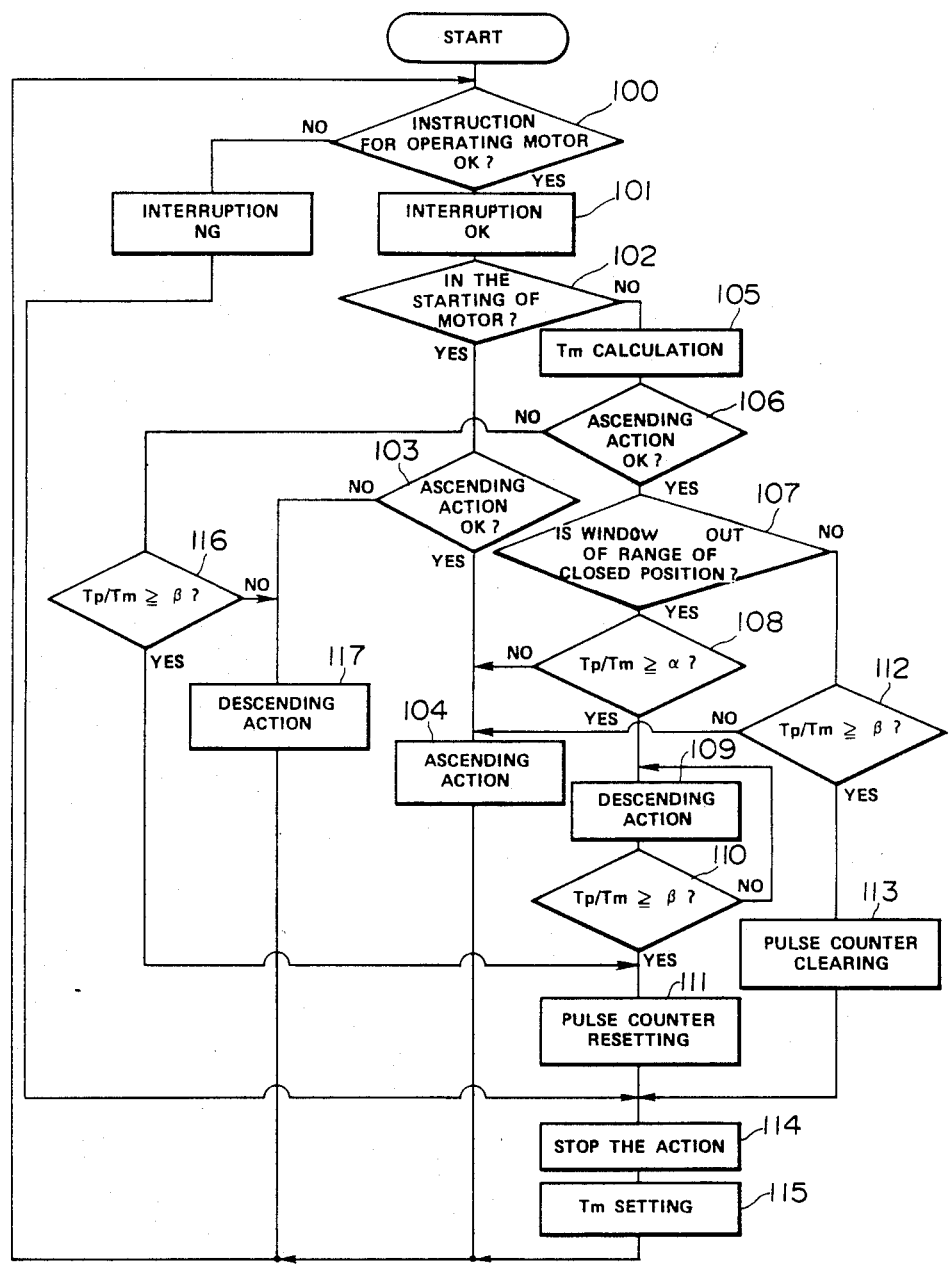
FIG. 5 is a flow chart illustrating action of a third embodiment of the automatic opening and closing device for the window according to this invention.

The pulse-detecting circuit 30 detects a pulse signal described later and output into the CPU 34 and a counter 36. The CPU 34 detects a position of the window 26 in accordance with the pulse number counted by the counter 36. Namely, the CP 34 has a map 46 able to compare and contrast the position of window 26 with the pulse number, and detect that the window 26 is entirely closed when the pulse number is 0 and the window 26 is fully opened when the pulse number is 2000 (Pmax), for example. Further, an obstacle 48 shown in FIG. 5 is caught between the window frame 24 and the window 26.

A function of the third embodiment composed as described above is as follows.

Pushing an UP-botton on the operation switch panel 38 when an occupant intends to raise the window 26, causes the ascending demand signal 40a to be input into the CPU 34 from the operation switch panel 38. The CPU 34 outputs the ascending signal 42a into the driving circuit 28 according to input of the ascending demand signal 40a, the driving circuit 28 joins the motor 20 with the power source B by outputting the normal turn driving signal and drives it to raise the window 26.

By the rotation of the motor 20, a ripple current corresponding to the rotational frequency is generated in the motor current. A pulsating wave-form of the ripple current is transmitted to the pulse-detecting circuit 30 from the driving circuit 28. The pulse-detecting circuit 30 detects the ripple current, performs a wave-shaping of the pulsating wave-form and outputs a motor pulse signal to the CPU 34 and the counter 36. The counter 36 is actuated to count down in the ascending action of the window 26 and to count up in the descending action of the window 26 by the CPU 34 as described later. Therefore, when the pulse-detecting circuit 30 receives the motor pulse signal generated along with rotation of the motor 20 in the forward direction, the counter 36 counts down one by one corresponding to the number of pulse signal.

On the other hand the CPU 34 detects at all times whether or not an obstacle 48 is caught between the window frame 24 and the window 26 in accordance with the flow chart shown in FIG. 5. The CPU 34 determines whether or not the instruction (input of the ascending demand signal 40a or descending demand signal 40b) for operating the motor 20 is given at step 100, and prohibits the initiation of the interruption program shown in FIG. 6 and proceeds to step 114 if the instruction for operating is not given, or proceeds to step 101 and receives the demand for the interruption program shown in FIG. 6 if the instruction for operating is given.

Figure 6:
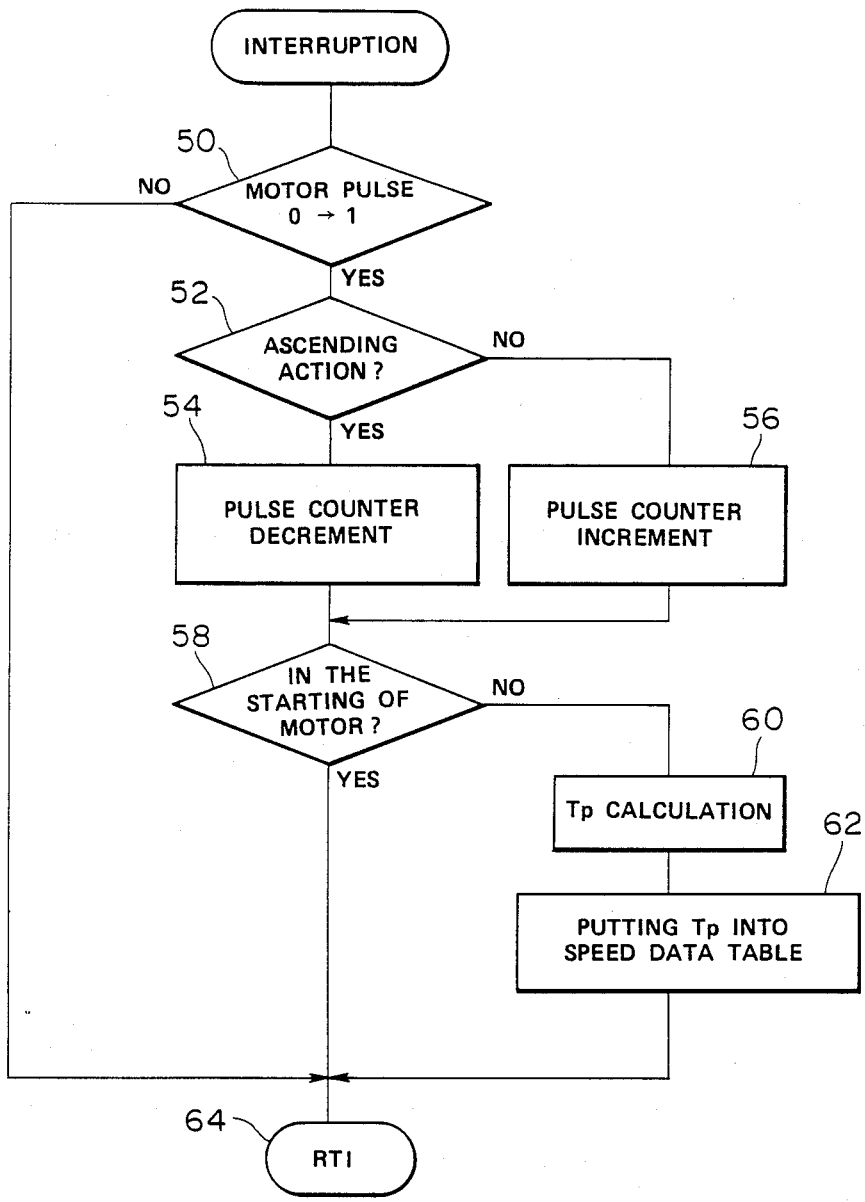
FIG. 6 is a flow chart of the method to obtain the window position and the motor speed in the third embodiment.
Figure 8:
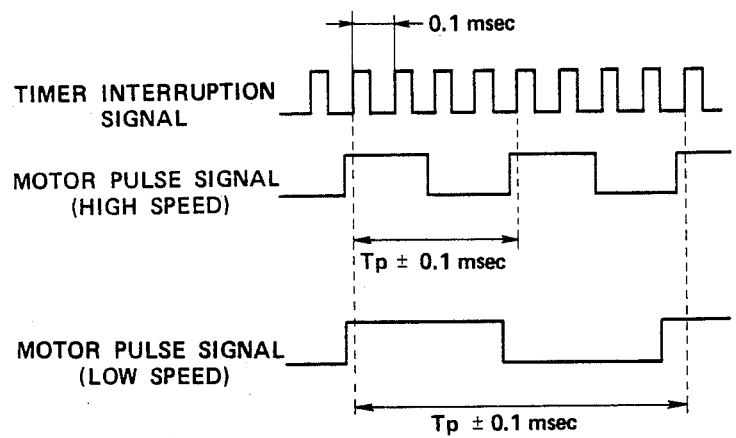
FIG. 8 is a diagram illustrating the timer interruption signal and motor pulse signals given by a pulse generating circuit.

The CPU 34 is given a timer interrupt signal with a regular cycle of 100 μsec as shown in FIG. 8, in the state possible to initiate the interruption program at the step 101, if the timer interrupt signal is generated, the interruption program is executed as shown in FIG. 6.

The interruption program is a process to detect the present position of the window and the motor speed on basis of the motor pulse signal output from the pulse-detecting circuit 30. Firstly at step 50, a determination is made whether or not the voltage level of the motor pulse signal changes from 0 (low level) to 1 (high level). If there is no change, it skips to step 64 and ends the interruption program. The CPU 34 at step 50, when the present voltage level is higher than that of previous time, i.e., the voltage level changes from 0 to 1, proceeds to step 52 and determines whether or not the window 26 is in the ascending process (up). If the window 26 is in the ascending process, it proceeds to step 54 and decrements (count down) the counter 36 by one, if the window 26 is in the descending process, it proceeds to step 56 and increments (count up) the counter 36 by one and proceeds to step 58.

It is well known that the motor pulse signal, i.e., the pulsating wave-form due to the ripple current of the motor 20 is generated at definite times (equal to the number of segments of the rotor of the motor 20) while the motor 20 makes one turn, and the number of rotation of the motor is in proportion to the ascending or descending distance of the window 26 due to the ascent and descent mechanism interconnected with the window 26. Accordingly, because the number of rotations of the motor is constant when the window ascends and descends from the entirely closed position to the full opened position shown in FIG. 7, for example, if the value of the counter 36 is made to 0 when the window 26 is at the entirely closed position, and value Pmax of the counter 36 is 2000 when the window 26 is at the full-opened position, it is possible to detect the position of the window 26 according to the contents of the counter 36. Namely, the present position of the window 26 is detected at step 54 and 56.

The determination is done at step 58 whether the starting period of the motor expires or not.

Figure 10A:
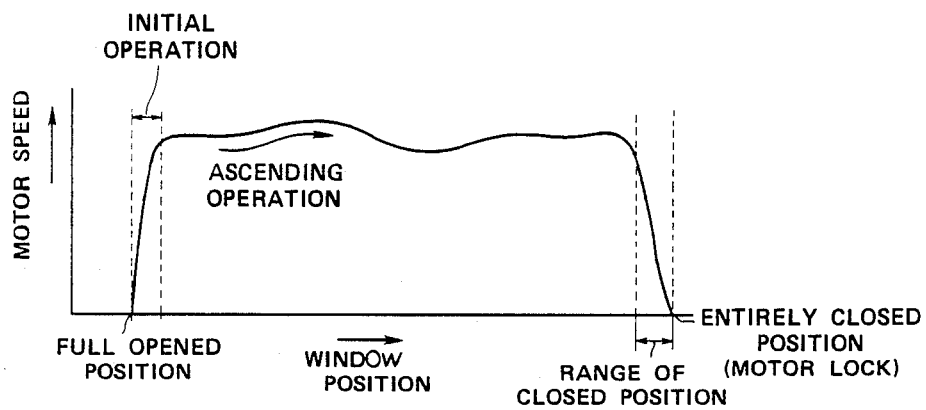
FIG. 10(A) is a diagram showing the relationship of window position and rotational speed of motor.

The rotational speed of the motor 20 shows remarkable variation at the starting of the motor (at the time initial operation) as shown the case of ascending of windshield 26 as exemplified in FIG. 10(A). Therefore, the time of initial operation such as a period of 100~200 msec after the starting of the motor 20, it is in the transient state, so that proceeding to step 64, the interruption program is ended. And when the CPU 34 determines it is not in the starting state of the motor at step 58, proceeds to step 60 and calculates the present rotational speed (cycle of the motor pulse signal) TP of the motor 20, and stores it into the speed data table of the memory as shown in step 62, proceeds to step 64 and ends the interruption program. The calculation of the cycle TP is obtained by calculating the time that elapses between the moment of passing the step 60 in the interruption program at previous time and the moment of passing the step 60 in the interruption program at the present time. Namely, the time that elapses between the timer interrupt signal after the changing of the motor pulse signal from 0 to 1 and timer interrupt signal after the next changing of the motor pulse signal from 0 to 1 is made to the cycle TP of the motor pulse as shown in FIG. 8. Accordingly, if the cycle of the timer interrupt signal is 100 $\mu$sec, the calculation accuracy of the cycle TP of the motor pulse signal is TP±100 $\mu$sec.

Furthermore, with respect to the cycle TP according to experimental data, although the cycle TP varies as the load of the motor 20 varies due to the sliding resistance between the window frame 24 and the window 26 the type of motor or the like, the actual measured value was approximately 1.2 msec at the maximum speed, and the calculated value was 1.1~1.3 msec. Therefore, the difference is at most about 10%. However, on the occasion of squeezing an obstacle, it has been certified by the experiment that it is out of the question practically because the motor speed decreases, the cycle TP increases and so an error becomes small. Further, on the occasion where the detecting accuracy of the cycle TP (motor speed) is intended to improve, the method may be adapted so that the cycle of the timer interrupt signal is small, or an average of motor pulse cycle is determined for present motor speed by measuring it m-times.

Figure 9:
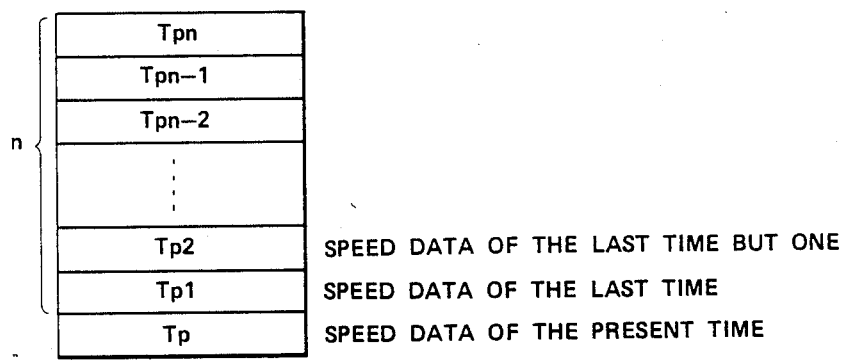
FIG. 9 is a diagram explaining an example of the data table of speed of motor used to calculate the rate of speed change of motor.

The aforementioned speed data table is determined as shown in FIG. 9 for example the cycles Tp are arranged in timewise order wherein the oldest cycle Tpn in point of time is deleted with every passing of step 62 and are changed such that the former Tp is updated to Tp1 and former Tp1 is updated to Tp2.

The CPU 34, arrives at step 64 when the interruption program ends, returns to the main-routine shown in the FIG. 5, proceeds to step 102 and determines whether or not the motor 20 is in the starting state. In the case of starting, the CPU proceeds to step 103 and a determination is done whether the window 26 is in the ascending process or not. If the input signal from the operation switch panel 38 is the ascending demand signal 40a, it is determined to be in the ascending process and proceeds to step 104, outputs the ascending signal 42a into the driving circuit 28 and returns to step 100. If the signal input into the CPU 34 is the descending demand signal 40b, the CPU 34 proceeds to step 117 from step 103, outputs the descending signal 42b into the driving circuit 28 and returns to step 100.

When the CPU 34 determines the motor not to be in the starting state at step 102, namely, a certain time elapses after the starting of the motor 20 and the motor is in the stationary operating state, the CPU 34 proceeds to step 105, and calculates the average Tm of speed data (cycle of motor pulse signal) of number n in the speed data table shown in FIG. 9 according to the following equation:

$$Tm = \frac{Tpn + Tpn - 1 + \ldots + Tp2 + Tp1}{n}$$

Namely, the calculation of the just previous motor speed is carried out at step 105. Thereafter, the CPU 34 proceeds to step 106 and determines whether the window 26 is ascending or not. If it is in the ascending process, CPU 34 proceeds to step 107 and determines whether or not the present position of the window is in a range of the entirely closed position (or vicinity of entirely closed position). The range of the closed position is the position that may be determined to be motor lock for entirely closing the window 26 even if the rate of rotational speed change becomes large due to the speed reduction of the motor 20 as shown in FIG. 10(a), and the position is free from danger of squeezing an obstacle 48. Namely, it is the position that the value of counter 36 is in a predetermined range such as a range of 0~100 (o~p in FIG. 7).

If the window 26 is out of the range of the closed position, it proceeds to step 108 and determines whether or not the ratio of present motor speed to motor speed of the previous time calculated at step 105 i.e., the rate of motor speed change Tp/Tm, exceeds the predetermined value $\alpha$.

Figure 11A:
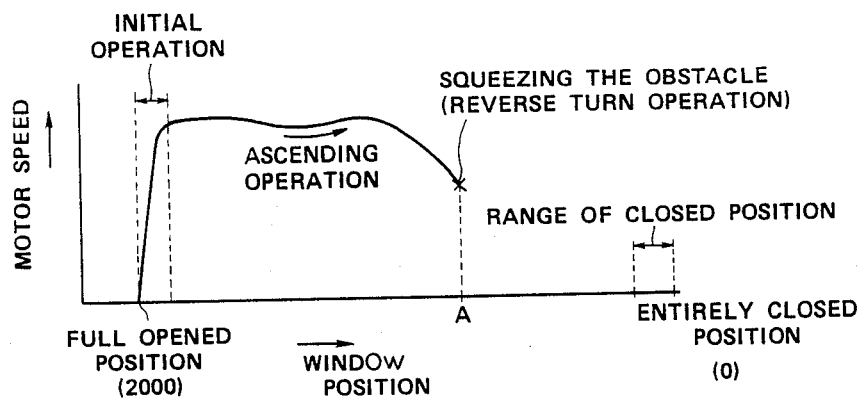
FIG. 11(A) is a diagram explaining the speed change of the case of squeezing an obstacle.
Figure 11B:
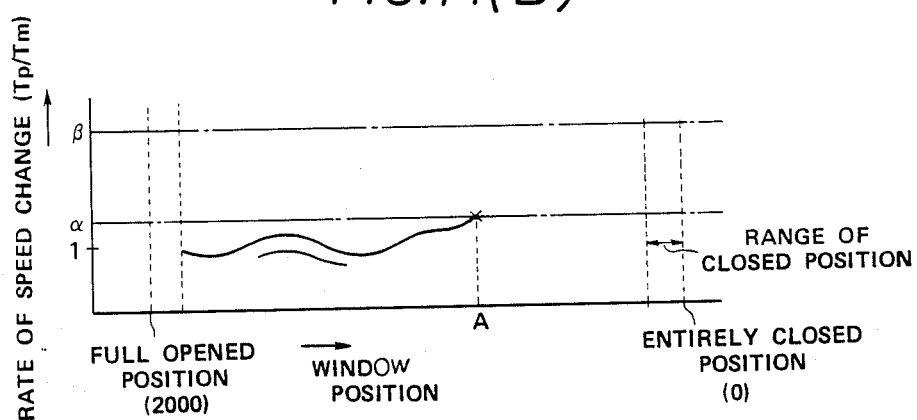
FIG. 11(B) is a diagram explaining the rate of speed change of motor in the case of squeezing an obstacle.

Thereby the determination is made possible whether the squeezing of an obstacle occurs or not. Namely, if the squeezing of the obstacle occurs, the load applied on the motor becomes large and the rotational speed of the motor decreases as shown in FIG. 11(A), so that the value of cycle Tp of the motor pulse signal becomes large. Therefore, when the motor speed decreases and Tp/Tm is not less than as shown in FIG. 11(b), the squeezing of an obstacle 48 is determined to occur.

Figure 10B:
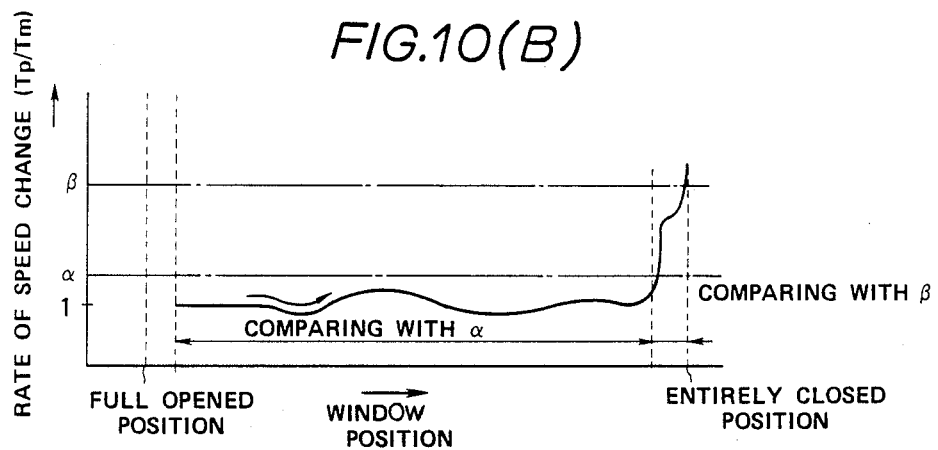
FIG. 10(B) is a diagram showing the relationship of window position and rate of speed change of motor.

The motor speed fluctuates to some degree due to the increase or decrease of load against the motor caused sliding resistance between the window frame 24 and the window 26 and the like and variation of voltage of the power source as shown in FIG. 10(B) even at the normal operation. In the case of setting the $\alpha$ value it is necessary to make a selection of proper value on the basis of the repeated experiments.

When the squeezing of an obstacle is determined to occur, proceeding to step 109, the CPU 34 issues the descending signal 42b into the driving circuit 28, makes the motor 20 rotate in reverse direction and the window 26 descend. The descending of window 26 continues until the determination is made that Tp/Tm is not less than $\beta$ at step 110. The value of $\beta$ is set such that $\beta$ is larger than $\alpha$. This is caused by detecting the rate of motor speed change because the rate of motor speed change becomes large at the full opened position and entirely closed position of the window as shown in the case of ascending of the window 26 exemplified in FIG. 10(B). And by making $\alpha$ to be less than B, the squeezing is made possible to be detected before the speed reduction of the motor increases comparing with that at the closing position, i.e., before the power for squeezing the obstacle increases and it is possible to avoid squeezing of the obstacle by rotating the motor in the reverse direction.

The CPU 34 proceeds to step 111 when the full-opening of the window is detected at step 110 and resets the value of counter 36. This is carried out in order to improve the reliability for detecting the position or the window 26. Namely, there is a possibility that the counter 36 miscounts the motor pulse signal due to a power source variation of the motor 26 or the mixing of induced noise. Therefore, when the window 26 is fully opened the counter 36 is reset to the reference value, and when the window 26 is entirely closed the counter 36 is cleared to zero, whereby a divergence between value of counter and actual position of window is prevented.

Next, the CPU 34 proceeds to step 114 outputs a motor stop signal into the driving circuit 28 and sets the speed data table Tm shown in FIG. 5 at step 115. Namely, it makes every value in the speed data table to Tm. These are used as data when the motor starts and period of initial operation elapses proceeding to step 105 from step 102 at first, and motor speed is calculated. Tm is obtained experimentally.

After the setting of the Tm at step 115, the CPU 34 returns again to step 100.

When the CPU 34 determines the window not to be in the ascending process at step 106, it proceeds to step 116, and determines whether the window is at the fully opened position or not. If the window is at the fully opened position, the CPU 34 proceeds to step 111, if it is not at the fully opened position, proceeds to step 117, issues the descending signal into the driving circuit 28 and returns to step 100.

And when the CPU 34 determines the window to be in the ascending process at step 106 and determines the window to be in the range of closed position at step 107, proceeds to step 112, and determines whether or not Tp/Tm is not less than $\beta$, i.e., the window is in the entirely closed position. If the window is in the entirely closed position, the CPU 34 proceeds to step 113, clears the counter 36 to zero and returns to step 100 and executes the process at step 114 and step 115. However, when the CPU 34 determines that Tp/Tm is less than $\beta$, it proceeds to step 104, issues the ascending signal to the driving circuit 28 and returns to step 100 as the window is not fully opened yet.

When the CPU 34 determines the window to be in the ascending process at step 106, determines it to be out of the range of closed position at step 107 and determines that an obstacle 48 is not caught at step 108, the CPU 34 executes the process of step 104 and returns to step 100.

As described above, in this embodiment it is possible to decrease the influence due to the fluctuation of motor load by means of monitoring the rate of speed change of motor which is not the absolute quantity differing from the speed of motor 20. The squeezing of obstacle 48 is detected beforehand by selecting the comparative value (set value) $\alpha$ properly and it is possible to prevent damage or injury to the squeezed obstacle 48 by descending the window 26 to the fully opened position, so that its safety is very high. The motor 20 cannot stop before the rate of speed change of motor 20 increases considerably, i.e., the pressing power increases sufficiently because comparative value $\beta$ larger than $\alpha$ is used at the entirely closed position and full opened position, so that it is possible to close or open the window 26 firmly.

Furthermore, in this embodiment the number of rotations of the motor 20 is counted by the counter 36, whereby the position of the window 26 is detected and a sensor is never mounted in the part of transmission mechanism including the motor's own body, so that it is possible to reduce the cost and remain free from various restrictions. The value of counter is cleared to zero when the window is closed entirely, and is reset when the window is full-opened, so that the malfunction is solved and the position of the window can be detected with accuracy. The range of closed position can be made smaller because the position of the window can be detected with accuracy. It is possible to detect the squeezing even if the squeezed obstacle is very small.

Figure 12:
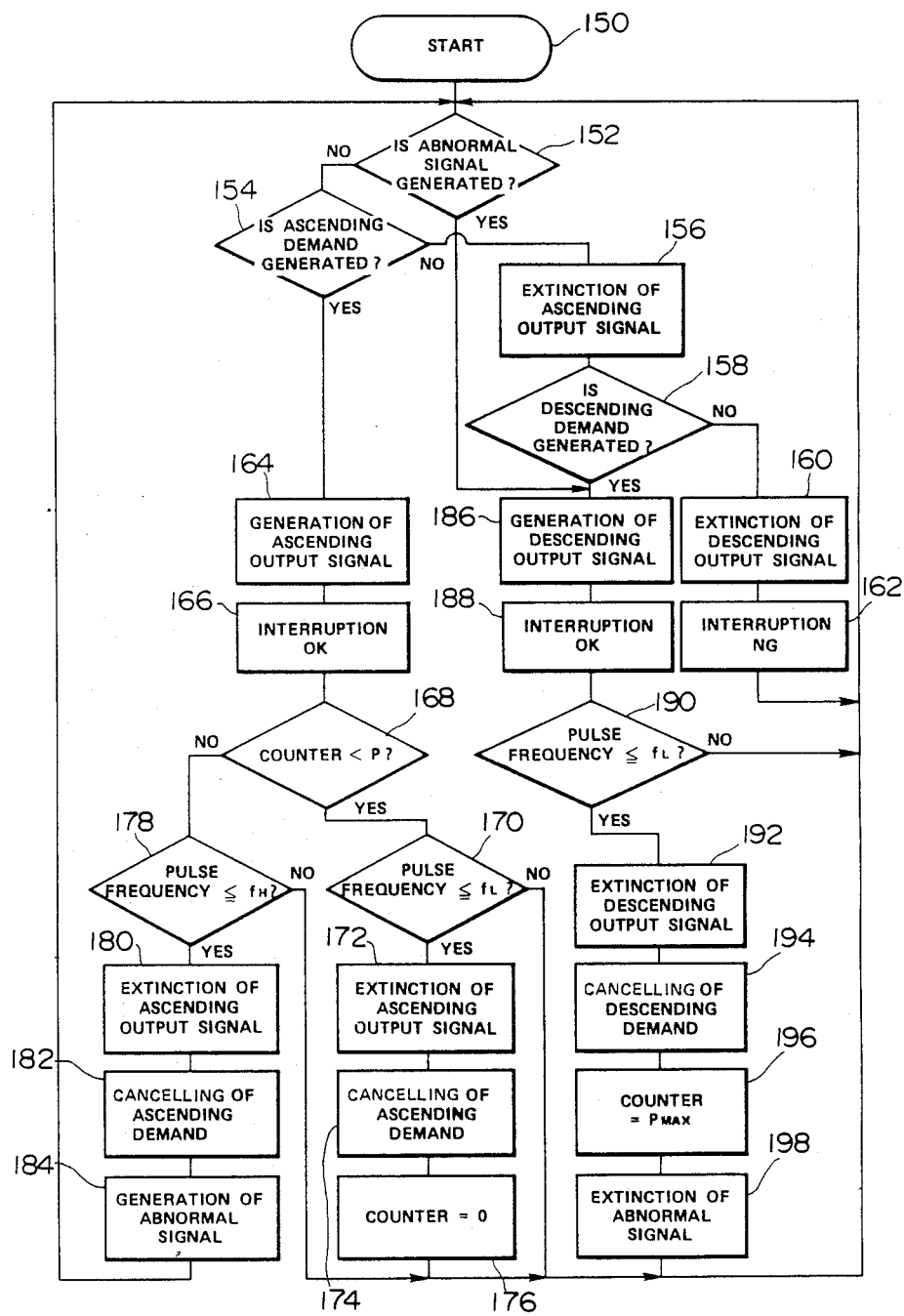
FIG. 12 and FIG. 13 are flow charts illustrating action of the other automatic opening and closing device for the window.
Figure 13:
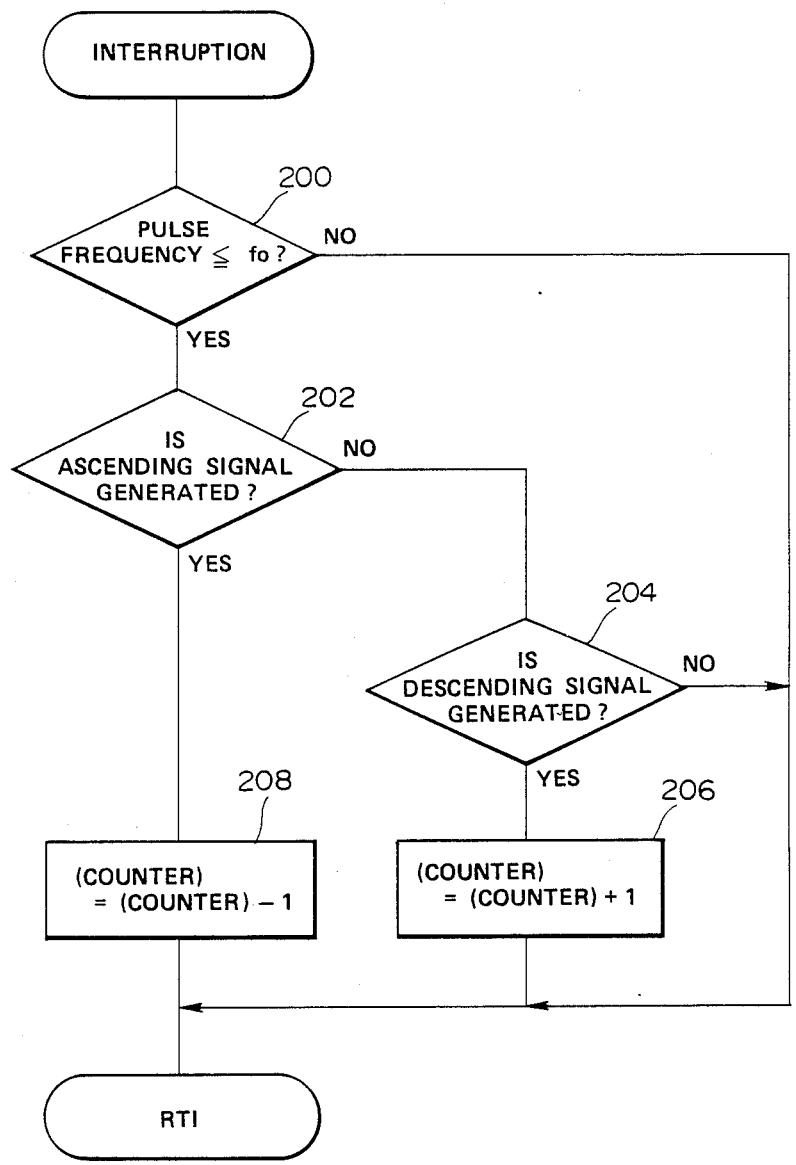

FIG. 12 and FIG. 13 are flow charts explaining an example for detecting the squeezing of an obstacle 48 in accordance with speed of the motor 20.

The CPU 34 executes a process all the time shown in FIG. 12, and starts the processing from step 150. When there is no operation for ascending and descending the window 26 i.e., the signal is not fed from the operation switch panel 38, as all of the signals are not generated, proceeds to step 156 from steps 152 and 154. The CPU 34 proceeds to step 162 through the steps 158 and 160 after the breaking of the ascending signal 42a at step 156, prohibits the interruption program shown in FIG. 13, and returns to step 152.

When the ascending demand signal 40a is input into the CPU 34 from the operation switch panel 38, the CPU 34 proceeds to step 164 from step 154. outputs the ascending signal 44a into the driving circuit 28, and makes the motor 20 rotate in the ascending direction of the window. After that, the CPU 34 proceeds to step 166, receives the interruption program handling, and enters the interruption routine with the motor pulse signal fed from the pulse generating circuit 30 acting as a trigger.

The interruption program shown in FIG. 13 corresponds to the detection of the position of the window shown in FIG. 6, compares the frequency of motor pulse signal (hereinafter called "pulse frequency") which is the rotational speed of the motor 20 output from the pulse-detecting circuit 30 with the set value $f_0$ at step 200. And when the pulse frequency is larger than the value $f_0$, i.e., the pulse frequency is abnormally large the CPU 34 determines it to be noise and returns to the main routine. In the case of "YES" at step 200, if the ascending signal issues the CPU counts down by one and if the descending signal issues it counts up by one, returns to the main routine and proceeds to step 168.

The CPU 34 compares the value of the counter 36 which is counted down by the interruption handling of FIG. 13 with the set value P at step 168. The set value P is the value showing the range of closed position of the window 26 as shown in FIG. 7, and it is 100 in the aforementioned example.

When the window 26 is determined to be in the range of the closed position at step 168, the CPU 34 proceeds to step 170 and compares the pulse frequency with the set value $f_L$. The set value $f_L$ corresponds to the set value $\beta$ of the previous embodiment. Therefore when the CPU determines it to be 'NO' at the step 170, it returns to step 152 since the window 26 is not fully closed yet and when it determines it to be "YES", it proceeds to step 176 through the steps 172 and 174, clears counter 36 to zero and returns to step 152, since the window 26 is entirely closed.

On the other hand when the CPU determines "NO" at step 168, i.e., the window 26 is out of the range of closed position the CPU proceeds to step 178 and compares the pulse frequency with the set value $f_H$. The set value $f_H$ corresponds to the set value $\alpha$ of previous embodiment. And in the case of "NO" at step 178 the CPU 34 returns to step 152 because the squeezing of the obstacle 48 does not occur, in the case of "YES" it determines squeezing of the obstacle 48 to occur, proceeds to step 184 through the steps 180, 182, generates the abnormal signal, and returns to step 152.

The CPU 34 generates the abnormal signal and returns to step 152 at step 184, proceeds to step 186, outputs the descending signal 42b into the driving circuit 28, makes the motor 20 rotate in the reverse direction and makes the window 26 descend. Then the CPU 34 proceeds to step 188, executes the interruption program of FIG. 13 (count down of counter) and proceeds to step 190. In the case of "NO" at step 190, the CPU 34 returns to step 152 and executes the loop process of steps 186, 188, 190, because the window 26 is not fully opened. When the CPU 34 determines "YES" at step 190, it proceeds to step 196 through the steps 192, 193 and resets the value of counter 36 to Pmax, breaks the abnormal signal at step 198 and returns to step 152, because the window 26 is fully opened.

Also in this flow chart, it is possible to detect the squeezing of obstacles in an early stage and it is possible to prevent damage or injury of the squeezed obstacle without providing a special sensor.

In the respective aforementioned embodiments, though the devices for ascending and descending, opening and closing the window of the door on the automobile are explained, these are also available for the opening and closing device for the window attached on the roof of the automobile.

We claim:

1. An automatic opening and closing device for a window comprising:
   a forwardly and reversely rotatable motor for opening and closing a window; and
   control circuit means connected to said motor and including:
   switching means for instructing said motor to rotate;
   pulse-detecting means for detecting a pulse generated by the rotation of said motor;
   counting means for counting pulses detected by said pulse-detecting means and for resetting a count number to a predetermined count number according to a prescribed signal;
   holding means for holding the rotation of said motor according to a signal output from said switching means; and
   holding-cancel signal generating means for detecting a count number counted by said counting means and for cancelling a holding state of said holding means by generating a holding-cancel signal when the count number reaches a predetermined reference value during an opening operation of the window;
   wherein said holding-cancel signal generating means comprises:
   a reference value-setting circuit for setting said predetermined reference value corresponding to a car speed; and
   a holding-cancel signal generating circuit for comparing the count number counted by said counting means with said predetermined reference value and for outputting said holding-cancel signal when the count number reaches said predetermined reference value corresponding to said car speed.

2. An automatic opening and closing device for a window according to claim 1, wherein said counting means comprises:
   an initial value-setting circuit for resetting a count number to said predetermined count number according to said prescribed signal generated when the frequency of the pulse detected by the pulse-detecting means is less than a predetermine frequency; and
   a counter to count a pulse-number detected by the pulse-detecting means.

3. An automatic opening and closing device for a window comprising:
   a forwardly and reversely rotatable motor for opening and closing a window; and
   control circuit means connected to said motor and including:
   switching means for instructing said motor to rotate;
   pulse-detecting means for detecting a pulse generated by rotation of said motor;
   counting means for counting a pulse-number detected by said pulse-detecting means;
   window position-detecting means for detecting whether or not said window is near to a closed position on the basis of a count number outputted from said counting means;
   speed operation means for calculating a rotational speed of said motor on the basis of the pulse detected by said pulse-detecting means;
   speed change operation means for calculating a rate of rotational speed change against a previously measured value of said motor on the basis of an output signal of said speed operation means;

window action-detecting means to detect whether said window is in a closing action;

reversing instructive signal generating means for reversing said motor for opening said window if an output signal from said speed change operation means exceeds a predetermined first set point when said window action-detecting means detects said window to be in said closing action and said window position-detecting means detects said window to be not near to the closed position; and stop instructive signal generating means for stopping said motor if the output from said speed change operation means exceeds a predetermined second set point when said window action-detecting means detects said window to be in said closing action and said window position-detecting means detects said window to be near to the close position.

4. An automatic opening and closing device for a window according to claim 3, wherein said predetermined second set point is larger than said predetermined first set point.

5. An automatic opening and closing device for a window according to claim 4, further including resetting means for resetting said count number when the window arrives in the entirely closed position and the fully opened position.

* * * * *